(Model.)
J. C. DEUEL.
Apparatus for Bleaching Fruit.
No. 238,031. Patented Feb. 22, 1881.
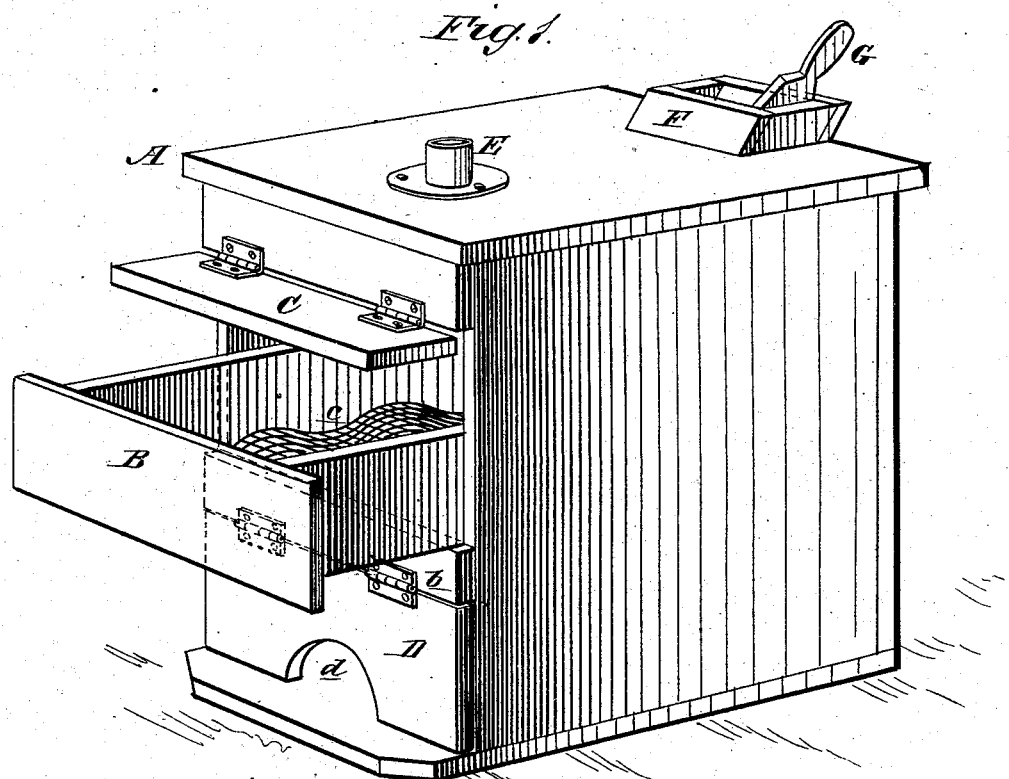
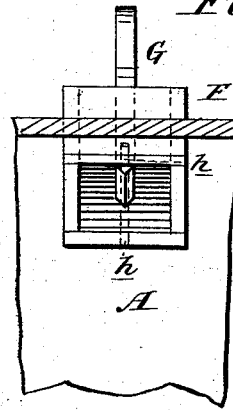
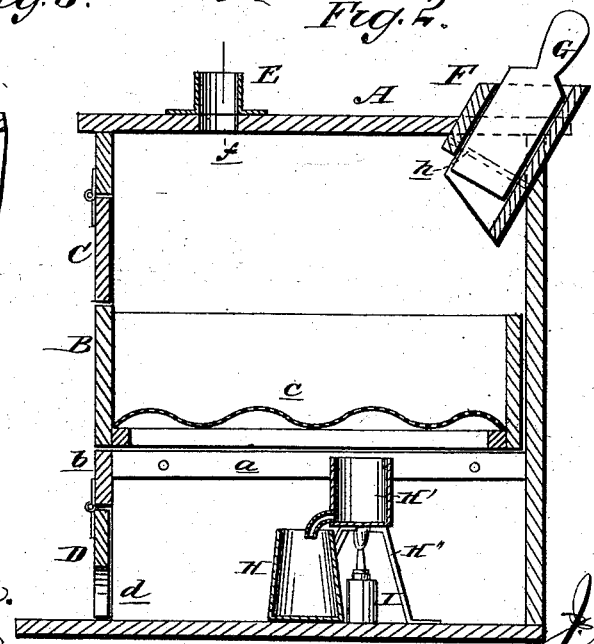
WITNESSES:
F. McArdle.
C. Sedgwick
INVENTOR:
J. C. Deuel
BY Munn & Co
ATTORNEYS.

UNITED STATES PATENT OFFICE.

JONATHAN C. DEUEL, OF REYNALE'S BASIN, NEW YORK.

APPARATUS FOR BLEACHING FRUIT.

SPECIFICATION forming part of Letters Patent No. 238,031, dated February 22, 1881.

Application filed October 30, 1880. (Model.)

*To all whom it may concern:*

Be it known that I, JONATHAN C. DEUEL, of Reynale's Basin, in the county of Niagara and State of New York, have invented a new and useful Improvement in Apparatus for Bleaching or Setting the Color of Fruit and Vegetables Preparatory to Drying, of which the following is a specification.

A common method of preparing dried fruits and vegetables for market is to slice them into baskets or other receptacles, and then remove and spread them on the drying-trays for treatment in artificial drying-machines; but in such process or method the fruit or vegetables become discolored by the brief exposure to the light and air in the baskets and in the drier before they are dried, and hence do not present so fair an appearance nor bring so good a price in the market as if they were not discolored. To prevent this discoloration the practice has come in vogue of treating the sliced fruits and vegetables immediately before they are put in the drier, but after they have been sliced into the baskets, with the fumes of sulphur, whereby the discoloration is removed; but this method is imperfect in its operation for the reason that the discoloration will reappear unless the subsequent drying process is immediately applied and is speedy in its operation.

The object of this invention is to set the original color of the fruit and vegetables, such as apples, pears, peaches, potatoes, &c., or bleach them immediately after they are sliced, so that they will not afterward in the drying process or manipulation become discolored by exposure to the air and light.

The invention consists of an improved fumigator designed especially for the convenient reception, exposure to the sulphur-fumes, and removal of the fruit or vegetables, and for a continuous automatic supply of sulphur, and to prevent the escape of the fumes to annoy the operators, all of which will be hereinafter fully described.

Figure 1 is a perspective view of the fumigator. Fig. 2 is a sectional side elevation of the same. Fig. 3 is a front elevation of a portion of the fumigator, showing the hopper and guide.

Similar letters of reference indicate corresponding parts.

In the drawings, A represents the case of the fumigator, which is preferably rectangular for convenience in construction and use.

B is a sliding drawer in the center of the case A, and extending from the front to rear thereof, and supported on suitable side strips $a$ $a$ within said case A and on the front strip $b$. Said drawer B has a bottom consisting of a wire netting or screen, $c$, corrugated, as shown, to give a better exposure of the sliced fruit and vegetables to the sulphur-fumes, said corrugations holding the slices angularly to the fumes, so as to permit a free passage of the fumes about them.

On the front of the case A, immediately above the drawer B, is a hinged door, C, extending entirely across the front of said case A, said door C being hinged so as to swing up and down with its lower edge when closed in close contact with the upper edge of the front of the drawer B. The purpose of this door C is to prevent the contents of the drawer B from being thrown out in the withdrawal of the said drawer B from the case A, as on raising the door C the drawer B may be drawn out with its contents piled up above its edges without said contents being disturbed, while were it not for this swinging door the contents would be scraped off into the case A.

Hinged on the front of the case A, below the drawer B, so as to swing vertically, is a door, D, having a semicircular opening, $d$, made in its lower edge. This door D is to be opened to permit the introduction or withdrawal of the devices for holding and burning the sulphur, and the opening $d$ serves for the admission of air into the case A, to create an upward draft when the door D is closed and the apparatus is in operation.

On the top of the case A is a smoke-pipe, E, fixed over a corresponding opening, $f$, in the case-top, and designed to create a sufficiently powerful draft upward from the case A to prevent the egress of sulphur-fumes from any of the openings, cracks, or crevices about said case A, even when the drawer B is opened.

In the top of the case A, at the rear end thereof, is inserted a hopper, F, for the admission of the sliced fruit and vegetables. Said hopper F is set at an inclination for the discharge of the fruit toward the center of the drawer B, and is provided with a guiding-plate, G, which is pivoted therein on an inclined pin, h, so that it can be pushed over from side to side of said hopper F, to give one direction or another to the entering slices, for the purpose of distributing them more evenly on the screen c.

H represents an earthen vessel, in which the sulphur is ignited by a match, live coal, or electric spark, said vessel H being set on the bottom of the case A, about centrally beneath the drawer B.

H' represents a vessel supported on a standard, H'', above the level of the top of the vessel H, and provided with a spout, g, that projects over the open top of said vessel H. This vessel H' is designed to hold a supply of sulphur or brimstone, which will be gradually melted by the heat of the lamp I and flow into the vessel H, where it will be burned, so that a constant supply of sulphur throughout the operation will be furnished to the vessel H.

The process consists in slicing the fruit or vegetables and introducing them as fast as sliced into the case A through the hopper F, where they are at once subjected to the sulphur-fumes arising from the vessel H, and thereby in a short time have their colors "set," or so affected as to be unchangeable on after exposure to light and air in removal to or in the drier. This process of setting the color, as well as that of removing the discoloration of the fruit and vegetables, is known to the trade as "bleaching."

Having thus fully described my invention, I claim as new and desire to secure by Letters Patent—

The case A, having reticulated fruit-drawer B, the upwardly-swinging door C, extending across the front and above the screen, the vertically-swinging door D, having air-opening d in its lower edge, and the smoke-pipe E, in combination with the sulphur-vessel H, the superposed vessel H', having spout g, and the lamp I, as and for the purpose specified.

JONATHAN C. DEUEL.

Witnesses:
I. I. STORER,
C. SEDGWICK.